(12) United States Patent
Blunier et al.

(10) Patent No.: US 8,997,667 B2
(45) Date of Patent: Apr. 7, 2015

(54) CONTROL SYSTEM MOUNTING ARRANGEMENT FOR AN AGRICULTURAL IMPLEMENT

(75) Inventors: Timothy R. Blunier, Danvers, IL (US); Brian McMahon, Deer Creek, IL (US); Jarod Murdock, Knoxville, IL (US)

(73) Assignee: CNH Industrial America LLC, New Holland, PA (US)

( * ) Notice: Subject to any disclaimer, the term of this patent is extended or adjusted under 35 U.S.C. 154(b) by 177 days.

(21) Appl. No.: 13/605,198

(22) Filed: Sep. 6, 2012

(65) Prior Publication Data

US 2014/0060405 A1 Mar. 6, 2014

(51) Int. Cl.
*F16K 15/02* (2006.01)
*B05B 1/20* (2006.01)
*A01C 23/00* (2006.01)

(52) U.S. Cl.
CPC ..................... *A01C 23/007* (2013.01)

(58) Field of Classification Search
USPC ............ 111/118–130, 200, 900, 925; 701/50
See application file for complete search history.

(56) References Cited

U.S. PATENT DOCUMENTS

| | | | |
|---|---|---|---|
| 3,490,695 A | 1/1970 | Rittenhouse | |
| 5,271,567 A | 12/1993 | Bauer | |
| 5,964,410 A | 10/1999 | Brown et al. | |
| 5,967,066 A | 10/1999 | Giles et al. | |
| 6,588,187 B2 * | 7/2003 | Engelstad et al. | 56/10.2 E |
| 6,622,939 B2 | 9/2003 | Swanson | |
| 7,270,147 B2 | 9/2007 | Bodie | |
| 7,395,769 B2 | 7/2008 | Jensen | |
| 2011/0017848 A1 | 1/2011 | Keith | |

* cited by examiner

*Primary Examiner* — Christopher J Novosad
(74) *Attorney, Agent, or Firm* — Rebecca L. Henkel

(57) ABSTRACT

An agricultural implement includes a storage tank, a pump positioned below a bottom portion of the storage tank, and a control system disposed above the bottom portion of the storage tank. The storage tank is configured to hold a flowable agricultural product. The pump is configured to direct the flowable agricultural product out of the storage tank. The one or more controls are configured to control application of the flowable agricultural product.

17 Claims, 4 Drawing Sheets

CONTROL SYSTEM MOUNTING ARRANGEMENT FOR AN AGRICULTURAL IMPLEMENT

BACKGROUND

The invention relates generally to ground working equipment, such as agricultural equipment, and more specifically, to a control system mounting arrangement for an agricultural implement.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles (e.g., positioned behind the openers) to deposit fertilizer at a desired depth beneath the soil surface. In certain embodiments, the implement may include knives (e.g., positioned behind the openers), instead of injection nozzles, to flow the liquid fertilizer into respective trenches formed by the openers and the knives. Using such implements, fertilizer may be distributed throughout a field, either before or after planting, to facilitate enhanced crop development.

A fertilizer application implement may include a storage tank to house a flowable agricultural product for distribution throughout a field. A pump may direct the flowable agricultural product from the storage tank to the injection nozzles or knives. Typically, control systems used to control application of the flowable agricultural product are located near the pump. Certain flowable agricultural products, such as fertilizer, may be corrosive to components of the agricultural implement. Improper fittings or leaks in conduits carrying fertilizer may cause the fertilizer to contact the control system located near the pump. Unfortunately, fertilizer that contacts the control system may corrode components within the control system, thereby reducing the longevity of the control system.

BRIEF DESCRIPTION

In one embodiment, an agricultural implement includes a storage tank, a pump positioned below a bottom portion of the storage tank, and a control system disposed above the bottom portion of the storage tank. The storage tank is configured to hold a flowable agricultural product. The pump is configured to direct the flowable agricultural product out of the storage tank. The one or more controls are configured to control application of the flowable agricultural product.

In another embodiment, an agricultural implement includes a plurality of row units, a storage tank having a first longitudinal end and a second longitudinal end, a pump disposed proximate to the first longitudinal end of the storage tank, a flow controller disposed proximate to the second longitudinal end of the storage tank, and wheels longitudinally positioned between the pump and the flow controller. The plurality of row units is configured to deliver flowable agricultural product to a field. The storage tank is configured to hold the flowable agricultural product. The pump is configured to direct the flowable agricultural product out of the storage tank. The flow controller is configured to control delivery of the flowable agricultural product from the pump to the plurality of row units. The pair of wheels is configured to at least partially support the agricultural implement.

In a further embodiment, an agricultural implement includes a frame having a first longitudinal end and a second longitudinal end, a storage tank configured to hold a flowable agricultural product, a pump positioned below the frame proximate to the first longitudinal end of the frame, and a control system positioned above the frame proximate to the second longitudinal end of the frame. The frame is configured to support the storage tank. The pump is configured to direct the flowable agricultural product out of the storage tank. The control system is configured to control application of the flowable agricultural product to a field.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
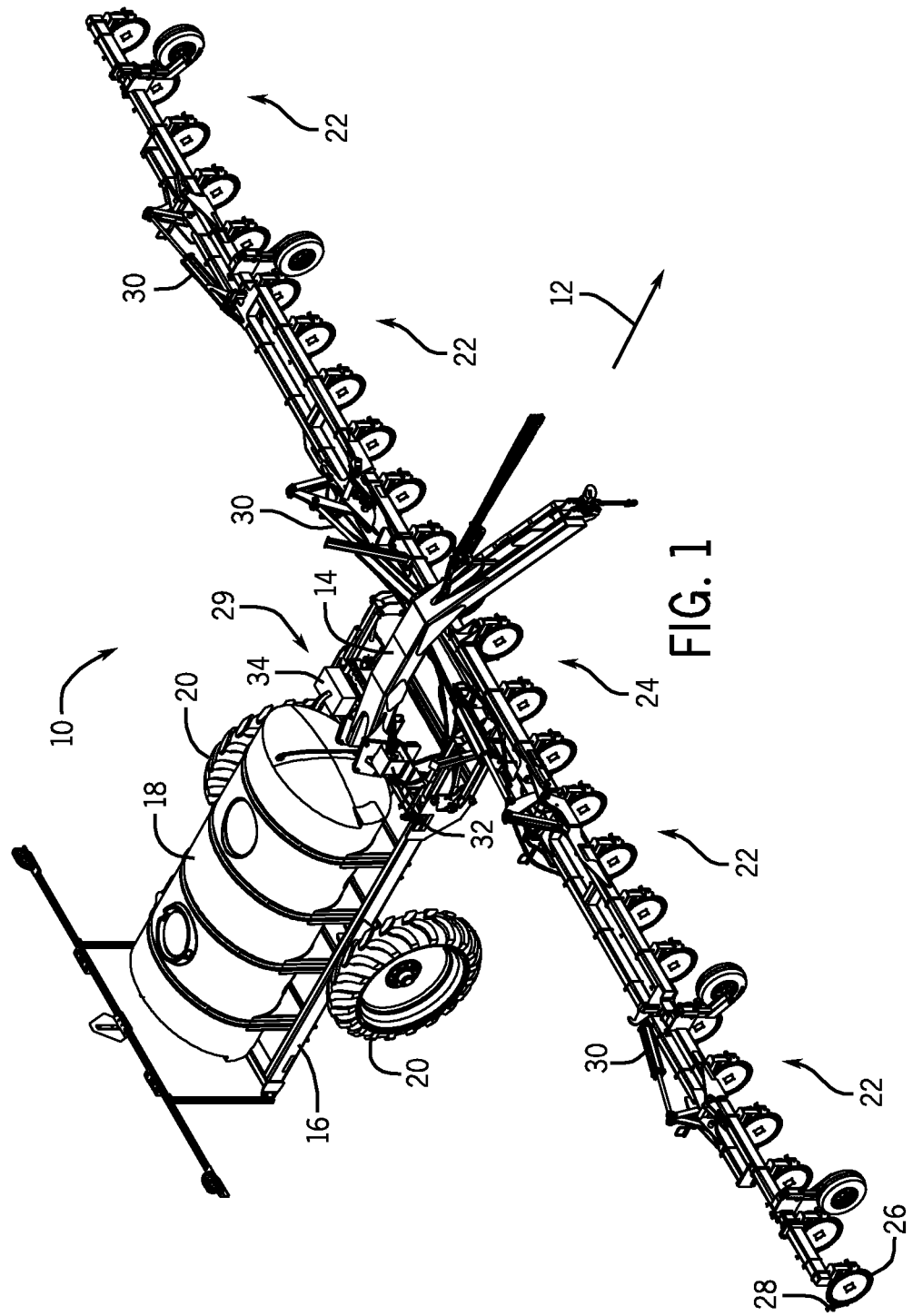
FIG. 1 is a perspective view of an embodiment of an agricultural implement having a flow controller mounted remotely from a pump.

FIG. 1 is a perspective view of an embodiment of an agricultural implement 10 having a flow controller mounted remotely from a pump. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" pull frame. As illustrated, the hitch assembly 14 is coupled to a main frame 16 of the implement 10 to facilitate towing of the implement 10 in the direction of travel 12. In the illustrated embodiment, the main frame 16 supports a storage tank 18 configured to house a flowable agricultural product, such as liquid fertilizer. The storage tank 18 may be a substantially cylindrical vessel. A pair of wheels 20 coupled to the main frame 16 is configured to support the weight of the frame 16, the storage tank 18, and the flowable agricultural product, thereby enabling the implement 10 to be towed across the field.

The implement 10 is configured to transfer the flowable agricultural product from the storage tank 18 to multiple row units 22 of a tool bar assembly 24. Each row unit 22 includes a ground engaging tool 26 configured to break the soil, thereby excavating a trench into the soil. An injection nozzle 28 or knife (e.g., positioned behind the ground engaging tool) is configured to deposit flowable agricultural product from the storage tank 18 into the trench formed by the ground engaging tool 26. In certain embodiments, the penetration depth of the ground engaging tools 26 is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., at the approximate midpoint between rows), thereby facilitating enhanced crop development. In addition, the implement 10 may be utilized to apply fertilizer to previously planted seeds (e.g., via injecting fertilizer between rows of previously planted seeds).

One or more controls of a control system 29 are configured to control the deposition of the fertilizer by the row units 22. In some embodiments, actuators 30 may adjust the height of at least some of the row units 22 of the tool bar assembly 24 (e.g., to change the number of rows to be fertilized). The actuators 30 may adjust the height of the row units 22 using hydraulic pistons, pneumatic pistons, and/or electric motors. An actuator controller 32 (e.g., hydraulic controller) is mounted on the agricultural implement 10 to control the actuators 30. In some embodiments, a hydraulic controller is fluidly coupled to each actuator 30, and is configured to control the height of at least some of the row units 22 relative to the field. A flow controller 34 is mounted on the agricultural implement 10, and is configured to direct the fertilizer through conduits to the injection nozzles 28 to deposit the fertilizer into soil.

In the illustrated embodiment, the actuator controller 32 and the flow controller 34 are mounted proximate to the hitch assembly 14. In this configuration, the main frame 16, the storage tank 18, and/or the wheels 20 may at least partially shield external portions of the actuator controller 32 and the flow controller 34 from contact with the fertilizer (e.g., from sprays, leaks, etc.), which may otherwise corrode some components of the controllers 32 and 34 (e.g., such as exposed components of the controllers 32, 34) upon contact and/or after prolonged exposure. Shielding and/or separating the controllers 32, 34 from external exposure to at least some of the fertilizer may reduce the maintenance time and costs associated with the controllers 32, 34.

Figure 2:
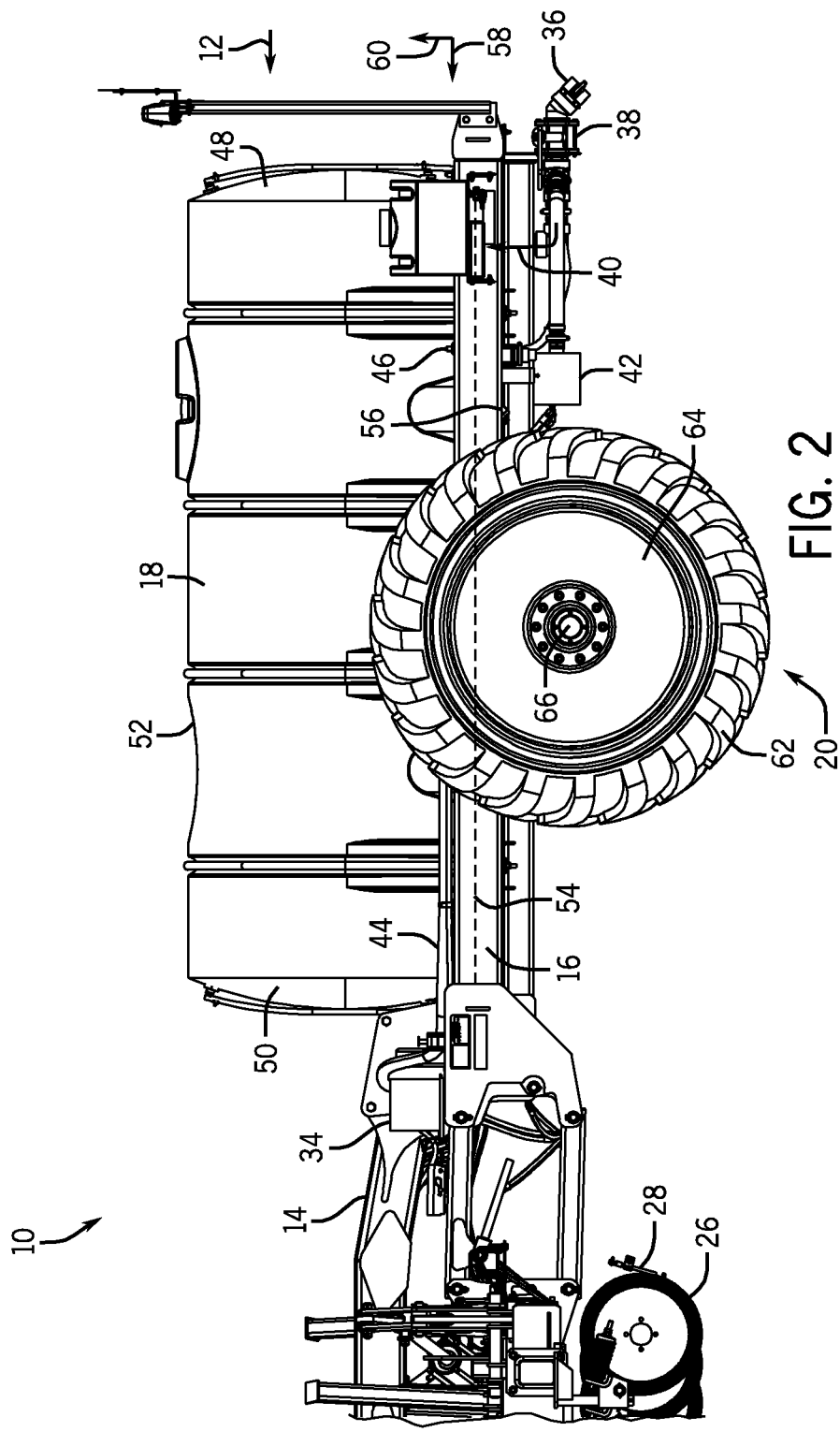
FIG. 2 is a side view of the agricultural implement of FIG. 1.

FIG. 2 is a side view of the agricultural implement 10 of FIG. 1. As discussed above, the flowable agricultural product (e.g., liquid fertilizer) is stored within the storage tank 18. In some embodiments, the fertilizer may enter the storage tank 18 through an inlet 36 and a valve 38, as shown by an arrow 40. A pump 42 receives the fertilizer from the storage tank 18, and directs the fertilizer through one or more supply lines 44 to the flow controller 34. The fertilizer in the storage tank 18 may be at atmospheric pressure. The pump 42 may pressurize the fertilizer in the supply lines 44 up to approximately 80, 100, 120, or 140 psi, or any subrange therein. In some embodiments, a filter 46 is configured to filter the fertilizer before, or after, the fertilizer flows through the pump 42. The storage tank 18 has a first end 48 (e.g., back end), a second end 50 (e.g., front end), a top portion 52, and a bottom portion 54. As shown in FIG. 2, the pump 42, the inlet 36, the valve 38, and the filter 46 are positioned proximate to the first end 48. In some embodiments, the pump 42 is positioned at the first end 48 (e.g., back of the agricultural implement 10). A motor 56 may be mounted proximate to the pump 42 to drive the pump 42.

The external surfaces of the components proximate to the first end 48 may be exposed to a greater amount of fertilizer than the external surfaces of the components proximate to the second end 50. For example, fertilizer may spray, drip, seep, and/or otherwise contact components near the first end 48 during routine maintenance and/or operation. As another example, fertilizer from the filter 46 may contact components at the first end 48 when replacing the filter 46. In some embodiments, fertilizer may drip or seep from connections between the pump 42, the valve 38, the filter 46, and the supply lines 44 when connected improperly and/or due to wear of the components. The pump 42, the inlet 36, and the valve 38 may be positioned at, or below, the bottom portion 54 of the storage tank 18 and the frame 16 to reduce the exposure of the frame 16, the storage tank 18, and the other components to fertilizer (e.g., via dripping fertilizer).

The flow controller 34 of presently contemplated embodiments may be spatially (e.g., longitudinally) separated from the pump 42 and other components positioned near the first end 48. Further, the flow controller 34 is in fluid connection with the pump 42 through the one or more supply lines 44. The spatial separation between the flow controller 34 and the pump 42 may reduce contact of exposed components of the flow controller 34 to the fertilizer. The flow controller 34 is positioned proximate to the second end 50, as shown in FIG. 2. In some embodiments, the flow controller 34 is positioned longitudinally in front (arrow 58) of the second end 50. Arrow 58 is parallel to the direction of travel 12 and is directed forward in the longitudinal direction. The flow controller 34 may be positioned vertically above (arrow 60) the pump 42 to reduce the likelihood of fertilizer flowing along the outside of one or more supply lines 44 to the flow controller 34. Arrow 60 is perpendicular to arrow 58, and is directed upward in the vertical direction. In the illustrated embodiment, the flow controller 34 may be positioned above the bottom portion 54 of the storage tank 18.

As discussed above, the wheels 20 are configured to support the frame 16 and the storage tank 18 of the agricultural implement 10. Each of the wheels 20 may have a tire 62 disposed about a rim 64 that rotates via an axle 66. As shown in FIG. 2, the frame 16 is positioned above the axle 66. In the illustrated embodiment, the wheels 20 are positioned longitudinally between the pump 42 and the flow controller 34. For example, the tire 62 may be positioned to substantially shield the flow controller 34 from a direct, or indirect, spray of fertilizer from the pump 42 or the valve 38. In some embodiments, the second end 50 of the storage tank 18 is located in front of the axle 66 in the longitudinal direction 58, and the first end 48 of the storage tank 18 is located behind the axle 66. The flow controller 34 may be positioned in front of and above the pump 42 with one of the wheels 20 positioned spatially (e.g., longitudinally) therebetween.

Figure 3:
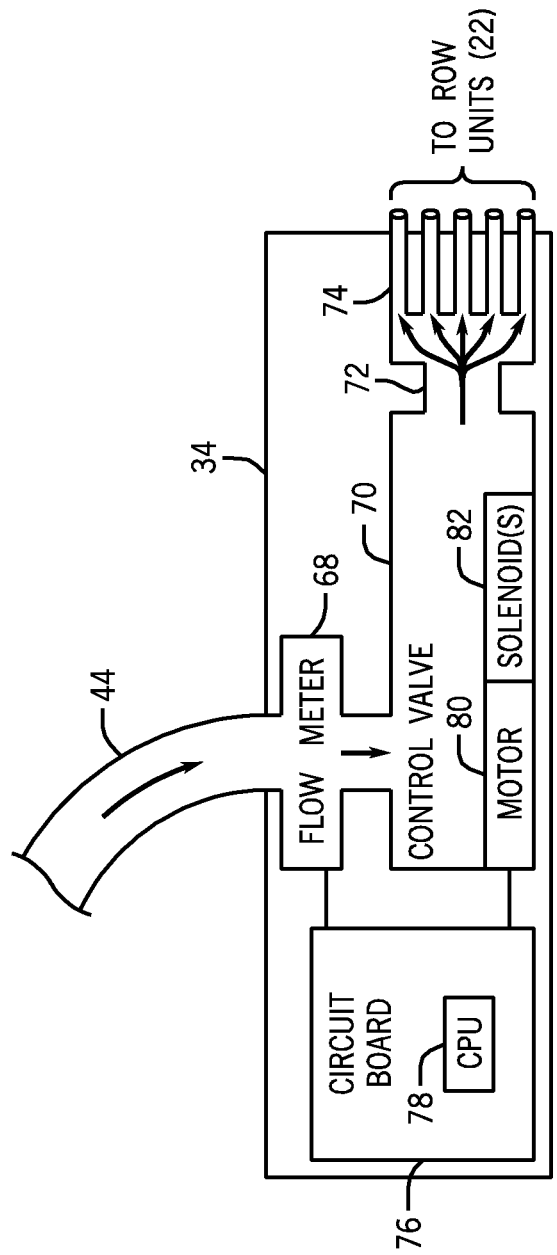
FIG. 3 is a block diagram of an embodiment of a flow controller of the agricultural implement of FIG. 1.

FIG. 3 is a block diagram of an embodiment of the flow controller 34 of the agricultural implement 10. The flow controller 34 is configured to receive the fertilizer from the pump 42 via the supply line 44, and to control application of the fertilizer to the field. The flow controller 34 may include a flow meter 68, a control valve 70, and a control manifold 72. The control manifold 72 is configured to direct the fertilizer from the supply line 44 into conduits 74 coupled to the row units 22. The flow meter 68 is configured to measure flow rate of the fertilizer into the control valve 70. The control valve 70 receives the fertilizer from the flow meter 68, and is configured to control (e.g., meter) the fertilizer flow into the control manifold 72. In some embodiments, a circuit board 76 is electrically coupled to the flow meter 68 and to the control valve 70. The circuit board 76 may have processing circuitry 78 (e.g., CPU) configured to adjust the control valve 70 based at least in part on feedback from the flow meter 68 and a desired flow rate for the row units 22. In some embodiments, a motor 80 is configured to adjust (e.g., open, close) the control valve 70 to change the fertilizer flow rate through the flow controller 34, and/or to direct the fertilizer to certain row units 22. As may be appreciated, one or more solenoids 82 may be configured to control the fertilizer flow through the control valve 70 and the control manifold 72. The solenoids 82 may be used to direct the fertilizer to certain row units 22. Some components (e.g., the circuit board 76, the processor 78, the motor 80, the solenoids 82) of the flow controller 34 may be substantially shielded internally from the fertilizer flowing through the flow controller 34. The internal surfaces of the flow meter 68, the control valve 70, and the control manifold 72 may be constructed from substantially non-reactive materials, and are configured to receive and direct the fertilizer without significantly reacting with the fertilizer.

Figure 4:
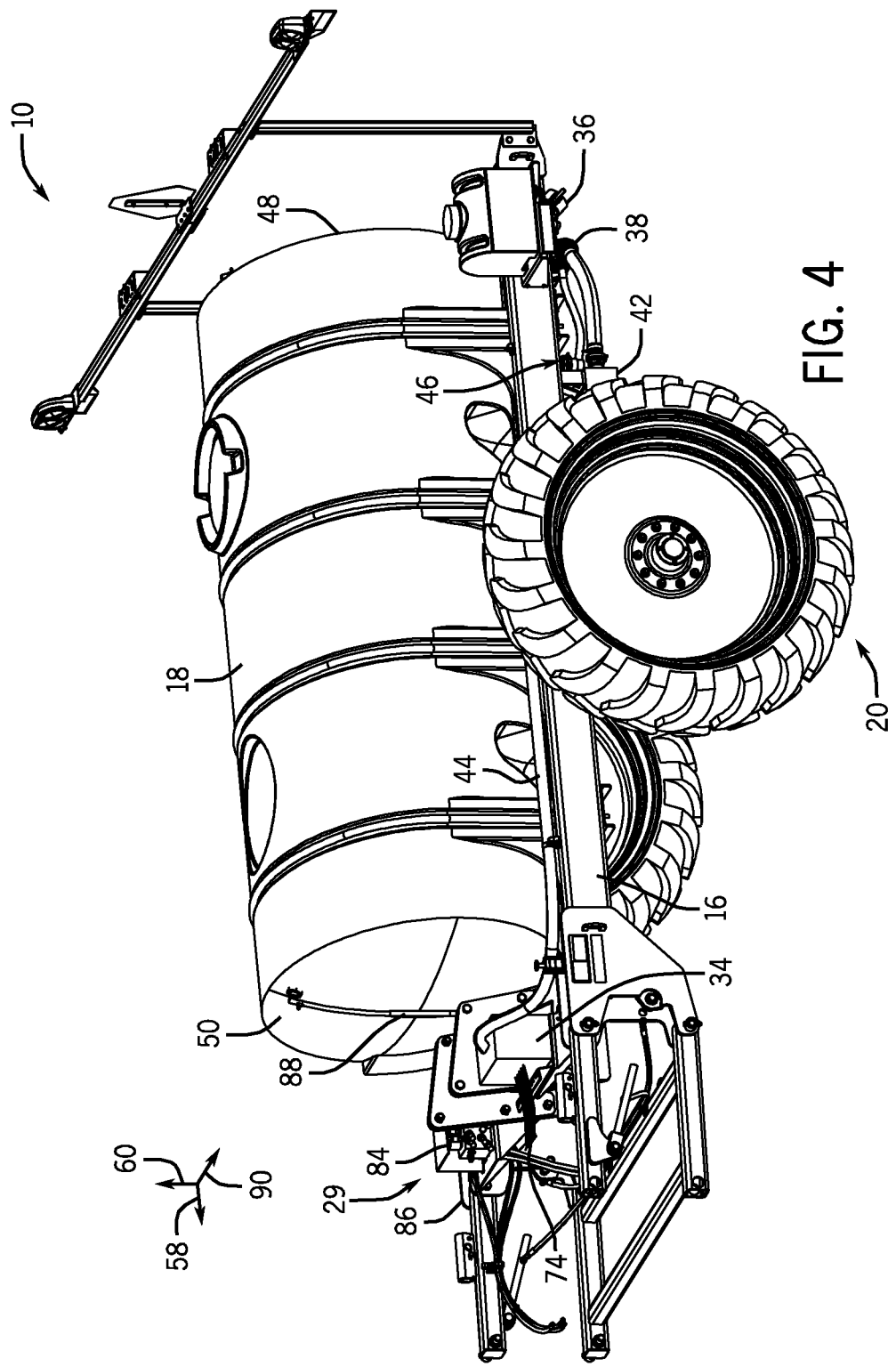
FIG. 4 is a perspective view of an embodiment of the agricultural implement of FIG. 1 having a control system.

As discussed above, the position of the flow controller 34 on the agricultural implement 10 may substantially shield the flow controller 34 from external exposure to the fertilizer. FIG. 4 illustrates an embodiment of the agricultural implement 10 of FIG. 1 with a control system 29 having an actuator controller 32 (e.g., a hydraulic controller 84) and the flow controller 34 to control application of the fertilizer to the field. The hydraulic controller 84 is configured to direct hydraulic fluid along hydraulic lines 86 to the actuators 30 to control the height of the row units 22 relative to the field. The hydraulic controller 84 may be configured to control a downward pressure on the row units 22, such as by actuating the wheels on the tool bar assembly 24 to control the penetration depth of the ground engaging tools 26. As discussed above, the flow controller 34 may be configured to control the flow rate of the fertilizer applied to the field.

The pump 42 is positioned below the frame 16 proximate to the first end 48. In contrast, the hydraulic controller 84 and the flow controller 34 are positioned proximate to the second end 50. The flow controller 34 may be positioned above the frame 16. The hydraulic controller 84 may be positioned below the frame 16. In some embodiments, the controllers 84, 34 are positioned longitudinally in front of the second end 50 near a central axis 88 of the storage tank 18. The pump 42 may be positioned away from the central axis 88 in a lateral direction shown by arrow 90. Positioning the controllers 84, 34 near the central axis 88 and the pump 42 away from the central axis 88 places at least a portion of the storage tank 18 spatially between the pump 42 and the controllers 84, 34. The portion of the storage tank 18 spatially between the pump 42 and the controller 84, 34 at least partially deflects a direct spray of fertilizer from the pump 42 to the controller 84, 34. In the illustrated embodiment, as shown in FIG. 4, at least one of the controllers 84, 34 is positioned vertically above (arrow 60) the frame 16 at the second end 50 longitudinally in front (arrow 58) of the wheel 20, near the central axis 88. The pump 42 is positioned below the frame 16, behind the wheel 20, and a lateral distance away (arrow 90) from the central axis 88. In this configuration, portions of the frame 16, the storage tank 18, and the wheels 20 are spatially between the pump 42 and the controllers 84, 34. Positioning at least portions of the frame 16, the storage tank 18, and/or the wheels 20 between the controllers 84, 34 and the pump 42 enables the frame 16, the storage tank 18, and/or the wheels 20 to at least partially shield the controllers 84, 34 from the fertilizer, such as a direct spray of fertilizer from the pump 42, the inlet 36, the valve 38, and/or the filter 46. This configuration may reduce the exposure of the controllers 84, 34 to drips, sprays, or leaks of the fertilizer as compared to configurations in which each controller is positioned proximate to the first end 48.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
   a storage tank configured to hold a flowable agricultural product;
   a pump configured to direct the flowable agricultural product out of the storage tank, wherein the pump is positioned below a bottom portion of the storage tank; and
   a control system configured to control application of the flowable agricultural product, wherein the control system comprises a flow controller configured to receive the flowable agricultural product from the pump, and the control system is disposed above the bottom portion of the storage tank and the pump.

2. The agricultural implement of claim 1, wherein the flowable agricultural product comprises a fluid fertilizer.

3. The agricultural implement of claim 1, wherein the flowable agricultural product comprises a liquid fertilizer.

4. The agricultural implement of claim 1, wherein the flow controller comprises at least one of a circuit board, a solenoid, and a motor.

5. The agricultural implement of claim 1, comprising a plurality of injection nozzles, wherein the flow controller is configured to control a flow rate of the flowable agricultural product from the pump to the plurality of injection nozzles.

6. The agricultural implement of claim 1, comprising a plurality of row units configured to deliver the flowable agricultural product to a field.

7. The agricultural implement of claim 6, wherein the control system comprises a hydraulic controller and the hydraulic controller is configured to control a height of at least one of the plurality of row units relative to the field.

8. The agricultural implement of claim 6, wherein each row unit of the plurality of row units comprises a ground engaging tool configured to break the soil to facilitate delivery of the flowable agricultural product to the field.

9. The agricultural implement of claim 1, comprising wheels configured to at least partially support the agricultural implement, wherein the wheels are longitudinally positioned between the pump and the flow controller.

10. The agricultural implement of claim 1, wherein the flow controller is spatially disposed longitudinally in front of the storage tank, and at least a portion of the storage tank is directly between the pump and the flow controller.

11. An agricultural implement, comprising:
    a plurality of row units configured to deliver flowable agricultural product to a field;
    a storage tank comprising a first longitudinal end and a second longitudinal end opposite the first longitudinal end, wherein the storage tank is configured to hold the flowable agricultural product;
    a pump configured to direct the flowable agricultural product out of the storage tank, wherein the pump is disposed proximate to the first longitudinal end of the storage tank;
    a flow controller configured to receive the flowable agricultural product from the pump and to control delivery of the flowable agricultural product from the pump to the plurality of row units, wherein the flow controller is disposed proximate to the second longitudinal end of the storage tank; and
    wheels configured to at least partially support the agricultural implement, wherein the wheels are longitudinally positioned between the pump and the flow controller.

12. The agricultural implement of claim 11, wherein the flowable agricultural product comprises a liquid fertilizer.

13. The agricultural implement of claim 11, wherein the flow controller comprises at least one of a circuit board, a solenoid, and a motor.

14. The agricultural implement of claim 11, wherein the flow controller is spatially disposed longitudinally in front of the storage tank, and at least a portion of the storage tank is directly between the pump and the flow controller.

15. The agricultural implement of claim 11, comprising a filter fluidly coupled between the storage tank and the pump, and longitudinally disposed proximate to the first longitudinal end, wherein the filter is configured to filter the flowable agricultural product flowing to the pump.

16. The agricultural implement of claim 11, wherein an inlet to the storage tank comprises an inlet spatially disposed proximate to the first longitudinal end of the storage tank.

17. The agricultural implement of claim 11, comprising a hydraulic controller configured to control a height of at least one of the plurality of row units relative to the field, wherein the hydraulic controller is disposed proximate to the second longitudinal end of the storage tank.

* * * * *